US012712396B2

(12) United States Patent
Choi

(10) Patent No.: US 12,712,396 B2
(45) Date of Patent: Aug. 18, 2026

(54) ELECTRONIC DEVICE COMPRISING CHARGING CIRCUIT

(71) Applicant: Samsung Electronics Co., Ltd., Gyeonggi-do (KR)

(72) Inventor: Hangseok Choi, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 775 days.

(21) Appl. No.: 18/107,071

(22) Filed: Feb. 8, 2023

(65) Prior Publication Data

US 2023/0187979 A1 Jun. 15, 2023

Related U.S. Application Data

(63) Continuation of application No. PCT/KR2021/010599, filed on Aug. 10, 2021.

(30) Foreign Application Priority Data

Aug. 12, 2020 (KR) ........................ 10-2020-0101201

(51) Int. Cl.

*H02J 50/70* (2016.01)
*H02J 7/06* (2006.01)

(Continued)

(52) U.S. Cl.

CPC ................ *H02J 50/70* (2016.02); *H02J 7/06* (2013.01); *H02J 50/12* (2016.02);

(Continued)

(58) Field of Classification Search

CPC ....................................................... H02J 50/70

(Continued)

(56) References Cited

U.S. PATENT DOCUMENTS 9,160,249 B2 10/2015 Yamada et al.
9,373,971 B2 6/2016 Ichikawa et al.

(Continued)

FOREIGN PATENT DOCUMENTS

CN 205160389 U 4/2016
CN 109327065 A 2/2019

(Continued)

OTHER PUBLICATIONS

European Search Report dated Nov. 23, 2023.

(Continued)

*Primary Examiner* — Yalkew Fantu
(74) *Attorney, Agent, or Firm* — CANTOR COLBURN LLP

(57) ABSTRACT

In accordance with an aspect of the disclosure, an electronic device comprises: a battery; a receive coil configured to wirelessly receive power from a transmit coil of an external power device; and a power management module electrically connected with the battery and the receive coil, wherein the power management module includes: a rectifier circuit configured to rectify current flowing in the receive coil, the rectifier circuit including an output terminal; a charging circuit configured to charge the battery including a plurality of switches and an input terminal, the input terminal connected to the output terminal of the rectifier circuit; and a rectifying capacitor electrically connected with the output terminal of the rectifier circuit and the input terminal of the charging circuit, and wherein the power management module generates a sync signal based on current flowing in the output terminal of the rectifier circuit and controls whether the plurality of switches operate or switching frequencies of the plurality of switches, based on the sync signal.

20 Claims, 8 Drawing Sheets

(51) Int. Cl.
*H02J 50/12* (2016.01)
*H02M 1/00* (2006.01)
*H02M 7/219* (2006.01)

(52) U.S. Cl.
CPC ......... *H02M 1/0095* (2021.05); *H02M 7/219* (2013.01); *H02J 2207/20* (2020.01)

(58) Field of Classification Search
USPC .......................................................... 320/108
See application file for complete search history.

(56) References Cited

U.S. PATENT DOCUMENTS

| | | | | |
|---|---|---|---|---|
| 9,419,510 | B2 | 8/2016 | Liu | |
| 9,634,514 | B2 | 4/2017 | Tschirhart | |
| 9,647,572 | B2 | 5/2017 | Robertson et al. | |
| 9,923,381 | B2 | 3/2018 | Walley et al. | |
| 9,923,409 | B2 | 3/2018 | Tschirhart | |
| 10,015,849 | B2 | 7/2018 | Liu | |
| 10,038,389 | B2 | 7/2018 | Robertson et al. | |
| 10,090,884 | B2 | 10/2018 | Ettes et al. | |
| 10,170,937 | B2 | 1/2019 | Menegoli | |
| 10,498,220 | B2 | 12/2019 | Nagaoka | |
| 10,523,052 | B2 | 12/2019 | Ettes et al. | |
| 10,547,212 | B2 | 1/2020 | Uchimoto | |
| 10,686,326 | B2 | 6/2020 | Lee et al. | |
| 10,951,062 | B2 | 3/2021 | Uchimoto | |
| 11,101,674 | B2 | 8/2021 | Walley et al. | |
| 11,101,737 | B2 | 8/2021 | Sun et al. | |
| 11,165,364 | B2 | 11/2021 | Zhan et al. | |
| 11,171,493 | B2 | 11/2021 | Kun et al. | |
| 11,177,681 | B2 | 11/2021 | Kim et al. | |
| 2009/0272735 | A1 | 11/2009 | Suenaga et al. | |
| 2010/0155393 | A1 | 6/2010 | Suenaga et al. | |
| 2010/0155394 | A1 | 6/2010 | Suenaga et al. | |
| 2010/0155395 | A1 | 6/2010 | Suenaga et al. | |
| 2013/0058134 | A1 | 3/2013 | Yamada et al. | |
| 2013/0307471 | A1 | 11/2013 | Ichikawa et al. | |
| 2014/0252973 | A1 | 9/2014 | Liu | |
| 2015/0180284 | A1* | 6/2015 | Kang | H02J 50/12 307/104 |
| 2015/0255989 | A1 | 9/2015 | Walley et al. | |
| 2015/0341085 | A1 | 11/2015 | Ettes et al. | |
| 2017/0025897 | A1 | 1/2017 | Menegoli | |
| 2017/0047768 | A1 | 2/2017 | Diekhans et al. | |
| 2017/0187230 | A1 | 6/2017 | Tschirhart | |
| 2017/0207724 | A1 | 7/2017 | Robertson et al. | |
| 2017/0229911 | A1 | 8/2017 | Ettes et al. | |
| 2018/0041060 | A1 | 2/2018 | Walley et al. | |
| 2018/0062447 | A1* | 3/2018 | Kiani | H02J 50/12 |
| 2018/0131234 | A1 | 5/2018 | Uchimoto | |
| 2018/0241301 | A1 | 8/2018 | Nagaoka | |
| 2018/0301943 | A1 | 10/2018 | Uchimoto | |
| 2018/0358833 | A1 | 12/2018 | Lee et al. | |
| 2019/0348849 | A1 | 11/2019 | Kun et al. | |
| 2020/0136421 | A1* | 4/2020 | Kim | H02J 50/80 |
| 2020/0195164 | A1* | 6/2020 | Zhan | H02M 7/219 |
| 2020/0212816 | A1 | 7/2020 | Sun et al. | |
| 2020/0313467 | A1 | 10/2020 | Lee et al. | |
| 2021/0226473 | A1 | 7/2021 | Mao et al. | |

FOREIGN PATENT DOCUMENTS

| | | | |
|---|---|---|---|
| EP | 2 916 468 | A2 | 9/2015 |
| JP | 2013-115961 | A | 6/2013 |
| JP | 2015-223042 | A | 12/2015 |
| KR | 10-2006-0091832 | A | 8/2006 |
| KR | 10-1471806 | B1 | 12/2014 |
| KR | 10-2018-0034411 | A | 4/2018 |
| KR | 20190012487 | A | 2/2019 |
| KR | 20200047173 | A | 5/2020 |
| KR | 20200063558 | A | 6/2020 |
| WO | 2017/110369 | A1 | 6/2017 |

OTHER PUBLICATIONS

Gleissner Michael et al: "Design and Control of Fault-Tolerant Nonisolated Multiphase Multilevel DC-DC Converters for Automotive Power Systems" IEEE Transactions on Industry Applications, IEEE Service Center, Piscatawar, NJ, US, vol. 52, No. 2, Mar. 1, 2016 (Mar. 1, 2016), pp. 1785-1795, XP 11603550.
International Search Report dated Nov. 30, 2021.
European Office Action dated May 9, 2025.
Korean Notice of Allowance dated Jun. 4, 2025.
Summons to Attend Oral Proceedings, Issued In EP Patent Application No. 21 856 203.3-1002, Issue Date Jan. 28, 2026, 15 Pages.

* cited by examiner

ELECTRONIC DEVICE COMPRISING CHARGING CIRCUIT

CLAIM OF PRIORITY

This application is a continuation of International Application No. PCT/KR2021/010599, filed Aug. 10, 2021 and published as WO 2022/035196, which in turn claims priority to Korean Patent Application No. 10-2020-0101201 which was filed Aug. 12, 2020, filed in the Korean Intellectual Property Office.

BACKGROUND

Technical Field

Certain embodiments disclosed in the disclosure relate to an electronic device including a charging circuit.

Description of Related Art

An electronic device such as a smartphone or a tablet PC may operate using power supplied from its battery. A power management module (e.g., a power management integrated circuit (PMIC)) may deliver power, supplied from the battery, to various components (e.g., a processor, a memory, or a communication chip) in the electronic device. The battery in the electronic device may be charged with external power.

Recently, electronic devices, each of which supports wireless charging in a magnetic induction scheme, have come to the market. The electronic device may connect a rectifying capacitor for reducing ripple current during the rectifying process. However, during high-speed wireless charging, the ripple current increases. As a result, a capacitor with a higher capacitance may be need to reduce the ripple current. However, a capacitor with a higher capacitance may have a larger size. Accordingly, the space need to mount the rectifying capacitor may increase, thereby increasing the size of the electronic device and manufacturing costs.

SUMMARY

Certain embodiments of the disclosure provide an electronic device for synchronizing a switching frequency of a charging circuit with a driving frequency of a rectifier circuit in implementing a wireless charging system to attenuate a ripple current of a rectifying capacitor.

In accordance with an aspect of the disclosure, an electronic device comprises: a battery; a receive coil configured to wirelessly receive power from a transmit coil of an external power device; and a power management module electrically connected with the battery and the receive coil, wherein the power management module includes: a rectifier circuit configured to rectify current flowing in the receive coil, the rectifier circuit including an output terminal; a charging circuit configured to charge the battery including a plurality of switches and an input terminal, the input terminal connected to the output terminal of the rectifier circuit; and a rectifying capacitor electrically connected with the output terminal of the rectifier circuit and the input terminal of the charging circuit, and wherein the power management module generates a sync signal based on current flowing in the output terminal of the rectifier circuit and controls whether the plurality of switches operate or switching frequencies of the plurality of switches, based on the sync signal.

According to certain embodiments, a method for charging a battery in an electronic device comprises: wirelessly receiving power from a transmit coil of an external power device at a receive coil in the electronic device; rectify current flowing in the receive coil with a rectifier circuit including an output terminal; charging the battery with a charging circuit including a plurality of switches and an input terminal, wherein the input terminal is connected to the output terminal of the rectifier circuit and wherein a rectifying capacitor is electrically connected with the output terminal of the rectifier circuit and the input terminal of the charging circuit, and generating a sync signal based on current flowing in the output terminal of the rectifier circuit and controlling whether the plurality of switches operate or switching frequencies of the plurality of switches, based on the sync signal.

With regard to description of drawings, the same or similar denotations may be used for the same or similar components.

DETAILED DESCRIPTION

Hereinafter, certain embodiments of the disclosure are described with reference to the accompanying drawings. Accordingly, those of ordinary skill in the art will recognize that modification, equivalent, and/or alternative on the certain embodiments described herein can be variously made without departing from the scope and spirit of the present disclosure. With regard to description of drawings, similar denotations may be used for similar components.

The electronic device according to certain embodiments disclosed in the disclosure may control a switching frequency of a charging circuit (e.g., a DC/DC converter) using an output current of a rectifier circuit. The output current of the rectifier circuit and the input current of the charging circuit (e.g., the DC/DC converter) increase in attenuation to reduce a ripple current of a rectifying capacitor. As a result, the capacity of the rectifying capacitor may be reduced.

The electronic device according to certain embodiments disclosed in the disclosure may detect a zero crossing point of the output current of the rectifier circuit and may control switching timing to have the same phase and frequency as the input current of the charging circuit (e.g., the DC/DC converter).

Electronic Device

Figure 1:
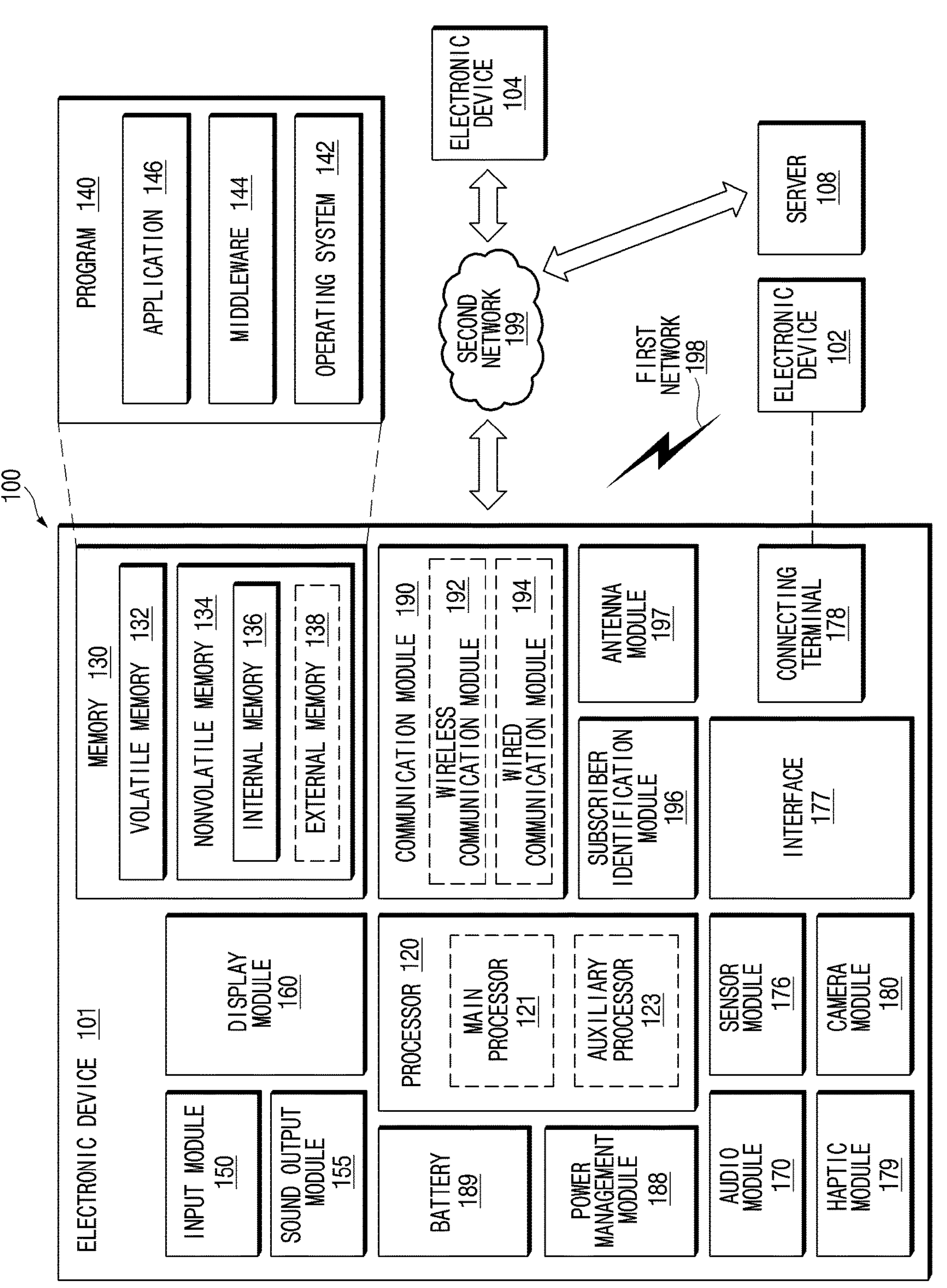
FIG. 1 illustrates an electronic device in a network environment according to certain embodiments.

FIG. 1 describes an electronic device that is powered by a battery 189. The battery 189 can only provide a limited amount of power for a limited duration of time. When the power of the battery 189 is depleted. The battery 189 can be recharged. While the battery 189 can be recharged by directly connecting the electronic device 101 to a power outlet, a direct connection may be inconvenient.

Accordingly, in certain embodiments, the electronic device 101 can be wirelessly charged. A wireless charger can generate an electromagnetic field that induces current in a receive coil. The power management module 188 charges the battery 189 with the current induced in the receive coil.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The term "processor" shall be understood to refer to both the singular and plural contexts in this document.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Wireless Charging

Figure 2:
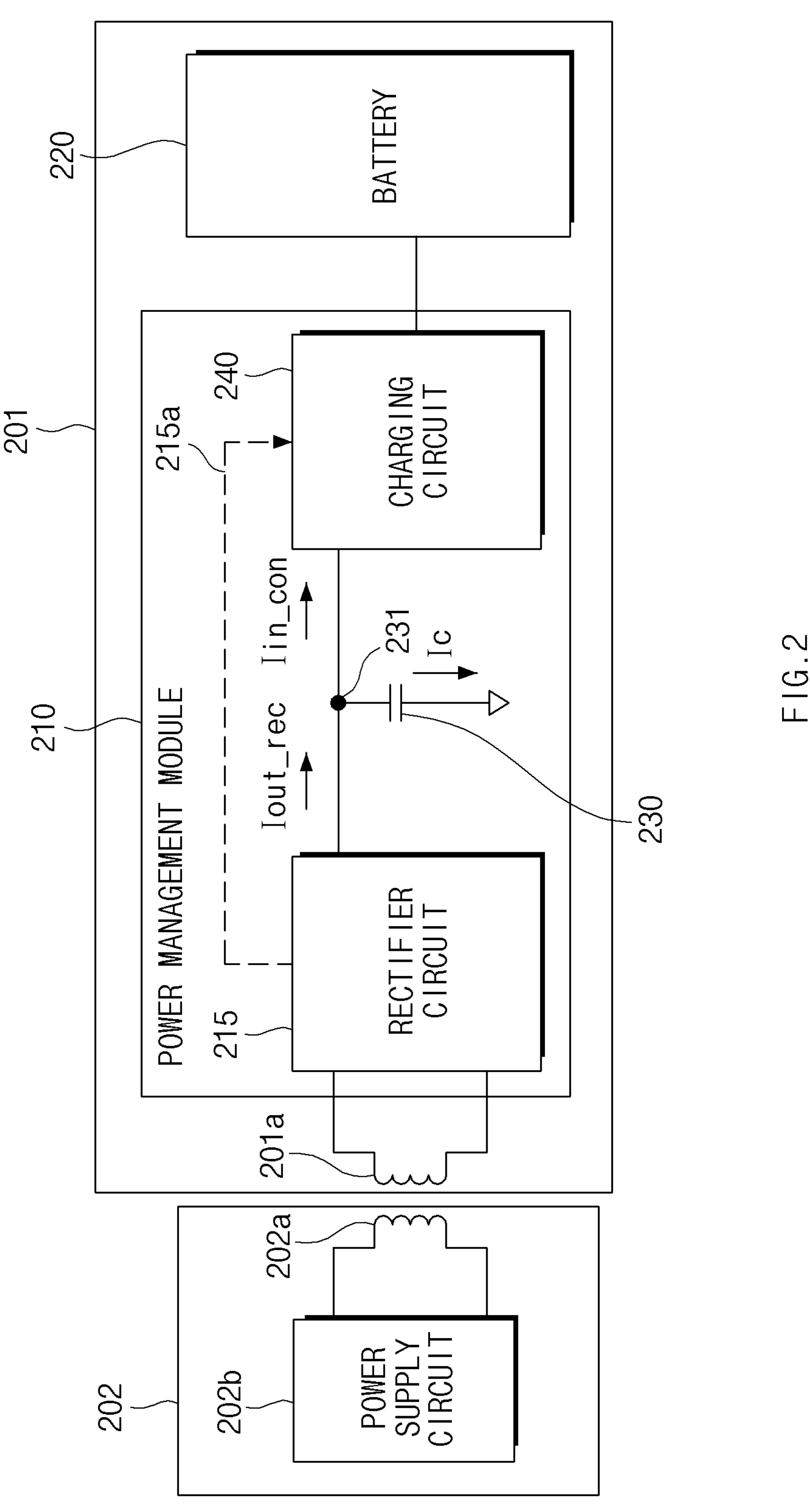
FIG. 2 is a block diagram of an electronic device according to certain embodiments.

FIG. 2 is a block diagram of an electronic device according to certain embodiments. FIG. 2 illustrates a configuration associated wireless charging, but not limited thereto. As noted above, the battery 189 of the electronic device 101 can be charged wirelessly by a wireless charger 202. The wireless charger 202 includes a transmit coil 202*a* that induces a current in a receive coil 201*a* of the electronic device 101.

The induced current in the receive coil 201*a* is an alternating (AC) current. In an AC current, there are sinusoidal peaks. A rectifying circuit 215 maintains, to an extent, the voltage level between the sinusoid peaks. However, the voltage level does drop, thereby resulting in a ripple current. The charging circuit 240 chargers the battery 220 with direct current (DC) power.

The output of the rectifier circuit 215 is connected to an input of the charging circuit 240. A rectifier capacitor 230 is connected between the connection point 231 of the output of the rectifier circuit 215 and the input of the charging circuit 240, and ground.

Referring to FIG. 2, an electronic device 201 (e.g., an electronic device 101 of FIG. 1) may wirelessly receive power through an external wireless charger 202 (e.g., an electronic device 102 of FIG. 2). The wireless charger 202 can be connected to a power outlet and generating an electromagnetic field with a transmit 202*a*.

The wireless charger 202 receive power from a power outlet and may supply power using a power supply circuit 202*b* and a transmit coil 202*a*. The wireless charger 202 may include the transmit coil 202*a*, and the electronic device 201 may include a receive coil 201*a*. When the receive coil 201*a* of the electronic device 201 and the transmit coil 202*a* of the wireless charger 202 are arranged within a specified distance, the transmit coil 202*a* induces current in the form of a sine wave in the receive coil 201*a* of the electronic device 201.

The electronic device 201 may include a power management module 210 (e.g., a power management module 188 of FIG. 1) and a battery 220 (e.g., a battery 189 of FIG. 1).

The power management module 210 may charge the battery 220 using the power received from the wireless charger 202. The power in the battery 220 may be supplied to various elements (e.g., components of FIG. 1) in the electronic device 201.

The power management module 210 may further include a separate arithmetic logic unit (or control circuit) therein. The arithmetic logic unit (e.g., a logic circuit or a micro controller unit (MCU)) in the power management module 210 may perform calculation and control associated with charging or discharging the battery 220.

The arithmetic logic unit may control switches in a rectifier circuit 215 or a charging circuit 240. According to another embodiment, the arithmetic logic unit may control the switches in the rectifier circuit 215 or the charging circuit 240, depending on a control signal provided from a processor (e.g., a processor 120 of FIG. 1) in the electronic device 201.

The power management module 210 (e.g., a charger IC or a PMIC) may include the rectifier circuit 215, a rectifying capacitor 230, and the charging circuit 240.

The rectifier circuit 215 may rectify current delivered through the receive coil 201*a* in the form of a half wave. For example, a signal (voltage or current) in the form of a sine wave may be induced (or generated) in the receive coil 201*a* by an external electromagnetic field. The rectifier circuit 215 may rectify a positive (+) and/or negative (−) half wave of the sine wave signal into a positive (+) signal (voltage or current). For example, the rectifier circuit 215 may be a full-bridge rectifier. The rectifier circuit 215 may apply the rectified output current Iout_rec in the form of the half wave to the rectifying capacitor 230.

The rectifying capacitor 230 may be connected with a node 231 with which an output terminal of the rectifier circuit 215 and an input terminal of the charging circuit (e.g., a DC/DC converter) 240 are connected.

Current Ic flowing in the rectifying capacitor 230 may include a ripple corresponding to a difference between an output current Iout_rec of the rectifier circuit 215 and an input current Iin_con of the charging circuit (e.g., the DC/DC converter) 240. The rectifying capacitor 230 may have a rating capable of handling the ripple of the current Ic.

As the ripple of the current Ic flowing in the rectifying capacitor 230 is smaller, a capacitor with a smaller capacity may be used.

The charger circuit 240 may charge the battery 220 based on the current supplied through the rectifier circuit 215. According to an embodiment, the charging circuit 240 may include a DC/DC converter circuit. The charging circuit 240 may include a circuit capable of operating as a linear regulator, a buck regulator, or a boost regulator. The charging circuit 240 may include at least one or more switched capacitor voltage divider (SCVD) circuits. The SCVD circuit may include at least one or more switches and at least one or more flying capacitors.

According to an embodiment, the power management module 210 may change a switching frequency of the charging circuit 240 based on a sync signal 215*a* provided from the rectifier circuit 215. As a result, the power management module 210 may reduce the ripple of the current Ic flowing in the rectifying capacitor 230. For example, the sync signal 215*a* may be a signal for sensing zero crossing of the output current Iout_rec of the rectifier circuit 215. Additional information associated with the sync signal 215*a* may be provided with reference to FIGS. 3 to 8.

The battery 220 may be charged with the power supplied from the wireless charger 202. The battery 220 may supply power necessary for an operation of the electronic device 201. The battery 220 may include, for example, a lithium-ion battery or a rechargeable battery.

Rectifier Circuit

Figure 3:
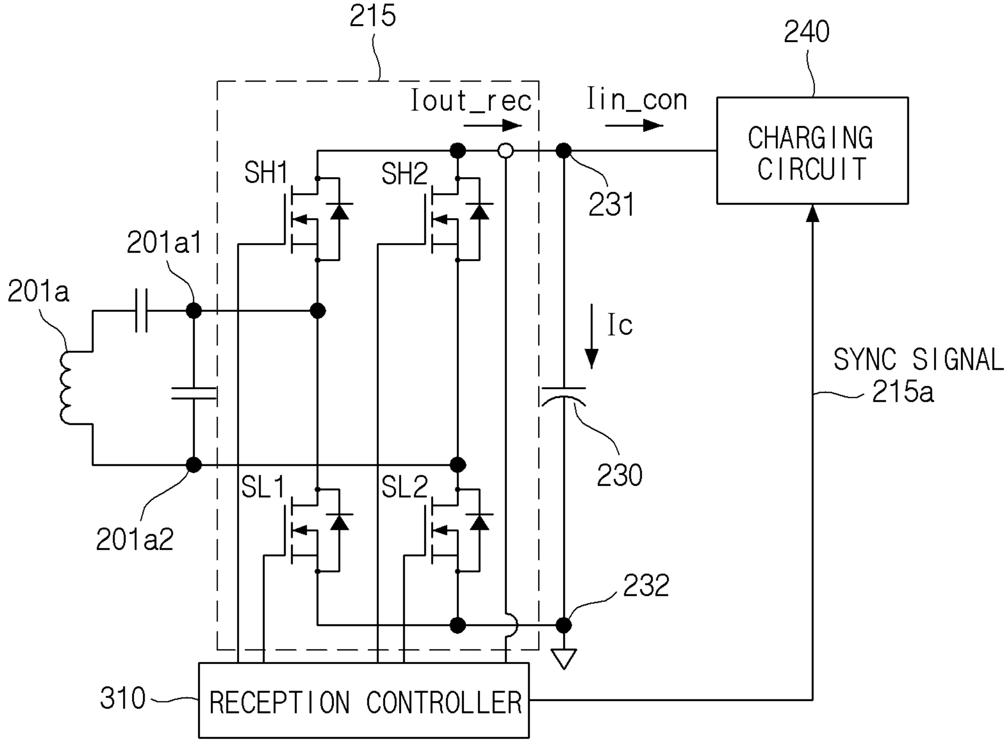
FIG. 3 is a drawing of a configuration of a rectifier circuit according to certain embodiments.

FIG. 3 is a block diagram of a configuration of a rectifier circuit according to certain embodiments. FIG. 3 is illustrative, but not limited thereto.

Referring to FIG. 3, a rectifier circuit 215 may receive current in which a current in the form of a sine wave from a receive coil 201*a*. The rectifier 215 rectifies the sine wave into a half wave form. The rectifier circuit 215 may apply the rectified output current Iout_rec to the rectifying capacitor 230.

The rectifier circuit 215 may be implemented as a full-bridge circuit. The rectifier circuit 215 may include a reception controller 310 and first to fourth switches SH1, SH2, SL1, and SL2.

It is noted that a sine wave includes a positive peak portion from 0 to π, and a negative peak portion from π to 2π/0. The switches can be controlled such that the output Iout_rec is the substantially, abs (sin t).

The reception controller 310 may control switching of the first to fourth switches SH1, SH2, SL1, and SL2. For example, in a first period, the first switch SH1 and the fourth switch SL2 may be turned on (that is, form a short), and the second switch SH2 and the third switch SL1 may be turned off (or form an open circuit). In a second period subsequent to the first period, the second switch SH2 and the third switch SL1 may be turned on, and the first switch SH1 and the fourth switch SL2 may be turned off. The reception controller 310 may control the first period and the second period to be repeated. The first period may correspond to a time when the phase of the sine wave is 0 to π, while the second period may correspond to a time when the phase of the sine wave is π to 2π/0.

According to an embodiment, current may flow through the first switch SH1 and the fourth switch SL2 in the first period, and current may flow through the second switch SH2 and the third switch SL1 in the second period. According to an embodiment, current may flow using diode characteristics of the first to fourth switches SH1, SH2, SL1, and SL2. The rectifier circuit 215 may output current in which a current in the form of a sine wave, which is delivered through the receive coil 201*a*, is rectified into a half wave form. That is, the foregoing control of the first to fourth switches inverts the connection between 201*a*1 and 201*a*2 to points 231 and 232 (ground).

A first terminal of the first switch SH1 may be connected with a first terminal 201*a*1 of the receive coil 201*a*. A second terminal of the first switch SH1 may be connected with a first terminal 231 of a rectifying capacitor 230. A first terminal of the second switch SH2 may be connected with a second terminal 201*a*2 of the receive coil 201*a*. A second terminal of the second switch SH2 may be connected with the first terminal 231 of the rectifying capacitor 230. The second terminal of the first switch SH1 and the second terminal of the second switch SH2 may be an output terminal of the rectifier circuit 215.

A first terminal of the third switch SL1 may be connected with the first terminal 201*a*1 of the receive coil 201*a*. A second terminal of the third switch SL1 may be connected with a second terminal 232 (the ground) of the rectifying capacitor 230. A first terminal of the fourth switch SL2 may be connected with the second terminal 201*a*2 of the receive coil 201*a*. A second terminal of the fourth switch SL2 may be connected with the second terminal 232 (the ground) of the rectifying capacitor 230.

A power management module 210 may generate and provide a sync signal 215*a*, corresponding to a change in the output current Iout_rec flowing in the output terminal of the rectifier circuit 215, to a charging circuit 240. The charging circuit 240 may control a switch included in the charging circuit 240 using the sync signal 215*a* to attenuate a ripple current Ic flowing in the rectifying capacitor 230 (refer to FIGS. 5 to 8).

An electronic device 201 may detect a voltage of the output terminal of the rectifier circuit 215 (a voltage of a node 231) and a voltage of a battery 220 and may transmit a power adjustment message to an external wireless charger 202. The wireless charger 202 may control transmitted power in response to the power adjustment message. For example, the power adjustment message may be a message (e.g., a control error packet (CEP)) delivered to the wireless charger 202 using a modulation signal. The electronic device 201 may deliver the power adjustment message using the receive coil 201*a*. Alternatively, the electronic device 201 may deliver the power adjustment message using a separate antenna.

Reception Controller

Figure 4:
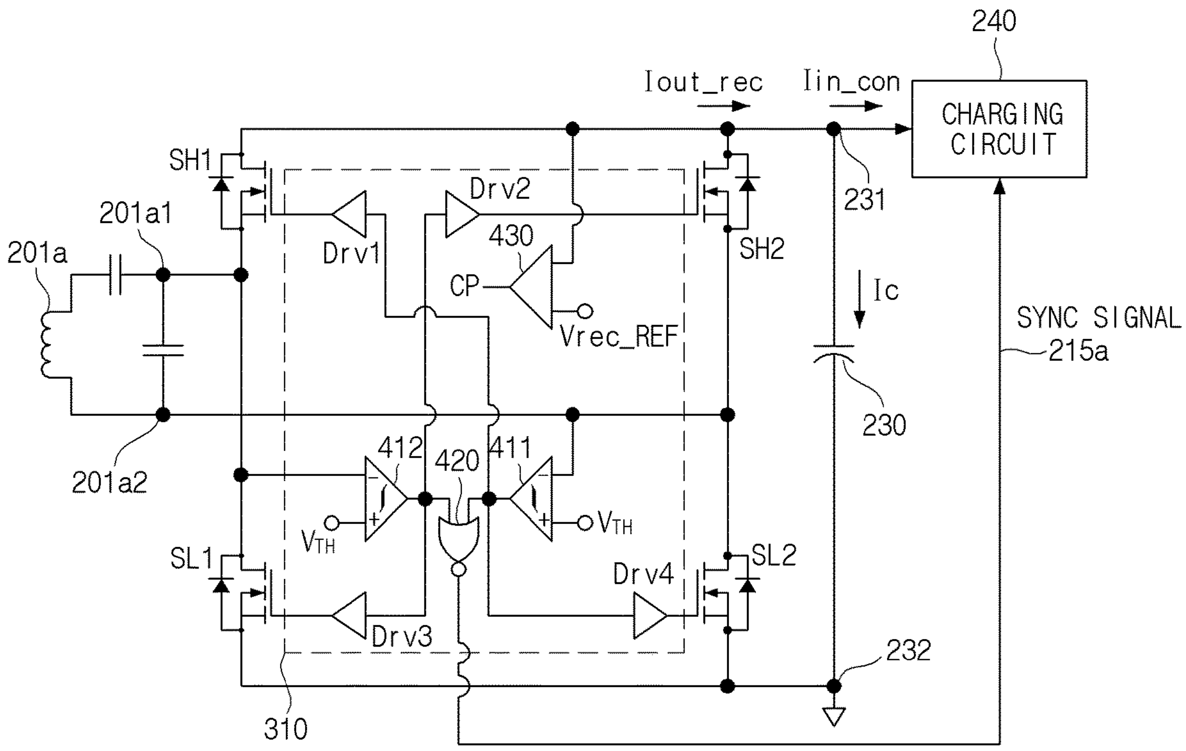
FIG. 4 illustrates a configuration of a reception controller according to certain embodiments.

FIG. 4 illustrates a configuration of a reception controller according to certain embodiments. FIG. 4 is illustrative, but not limited thereto.

Referring to FIG. 4, a reception controller 310 may transmit a sync signal 215*a* to a charging circuit 240. The sync signal 215*a* may be a signal corresponding to detection of zero crossing of an output current Iout_rec of a rectifier circuit 215.

The reception controller 310 may include a first comparator 411, a second comparator 412, a combiner 420 (or a NOR gate), and first to fourth drivers Drv1 to Drv4. The combiner 420 provides a sync signal 215*a* when both 201*a*1 or 201*a*2 are less than $V_{TH}$.

A first switch SH1 and a fourth switch SL2 may be controlled by a signal generated by the first comparator 411 that is connected with a second terminal 201*a*2 of a receive coil 201*a*. The first comparator 411 may compare a voltage of the second terminal 201*a*2 of the receive coil 201*a* with a specified reference voltage $V_{TH}$. An output terminal of the first comparator 411 may provide a gate signal of the first switch SH1 through the first driver Drv1. The output terminal of the first comparator 411 may provide a gate signal of the fourth switch SL2 through the fourth driver Drv4.

A second switch SH2 and a third switch SL1 may be controlled by a signal generated by the second comparator 412 connected with a first terminal 201*a*1 of the receive coil 201*a*. The second comparator 412 may compare a voltage of the first terminal 201*a*1 of the receive coil 201*a* with the specified reference voltage $V_{TH}$. An output terminal of the second comparator 412 may provide a gate signal of the second switch SH2 through the second driver Drv2. The output terminal of the second comparator 412 may provide a gate signal of the third switch SL1 through the third driver Drv3.

For example, in a first period, the first switch SH1 and the fourth switch SL2 may be turned on by the signal generated by the first comparator 411. In the first period, the second switch SH2 and the third switch SL1 may be in a turn-off state.

For example, in a second period, the second switch SH2 and the third switch SL1 may be turned on by the signal generated by the second comparator 412. In the second period, the first switch SH1 and the fourth switch SL2 may be in a turn-off state.

The combiner 420 may combine an output signal of the first comparator 411 and an output signal of the second comparator 412 to generate a sync signal 215*a*. For example, the combiner 420 may be implemented as a NOR gate. An output signal (the sync signal 215*a*) of the combiner 420 may be 0 when there is the output signal from the first comparator 411 or the second comparator 412 and may be 1 when there is no output signal from both the first comparator 411 and the second comparator 412.

The charging circuit 240 may deactivate switches included in the charging circuit 240 in response to the sync signal 215*a* received from the reception controller 310. As a result, the output current Iout_rec of the rectifier circuit 215 and an input current Iin_con of the charging circuit 240 may have a waveform similar to substantially the same phase, and a ripple of a current Ic of a rectifying capacitor 230 may be reduced.

The charging circuit 240 may change a switching frequency in response to the sync signal 215*a* received from the reception controller 310. For example, the ripple current Ic of the rectifying capacitor 230 may be reduced by multiplying the switching frequency by an integer multiple of a frequency (transmission frequency) of the sync signal 215*a*.

The reception controller 310 may further include a comparator 430. The comparator 430 may compare a voltage of an output terminal (a node 231) of the rectifier circuit 215 with a reference voltage Vrec_REF. The rectifier circuit 215 may generate a power adjustment message based on an output signal CP of the comparator 430. The rectifier circuit 215 may transmit the power adjustment message to an external wireless charger 202 to adjust the amount of supplied power.

Figure 5:
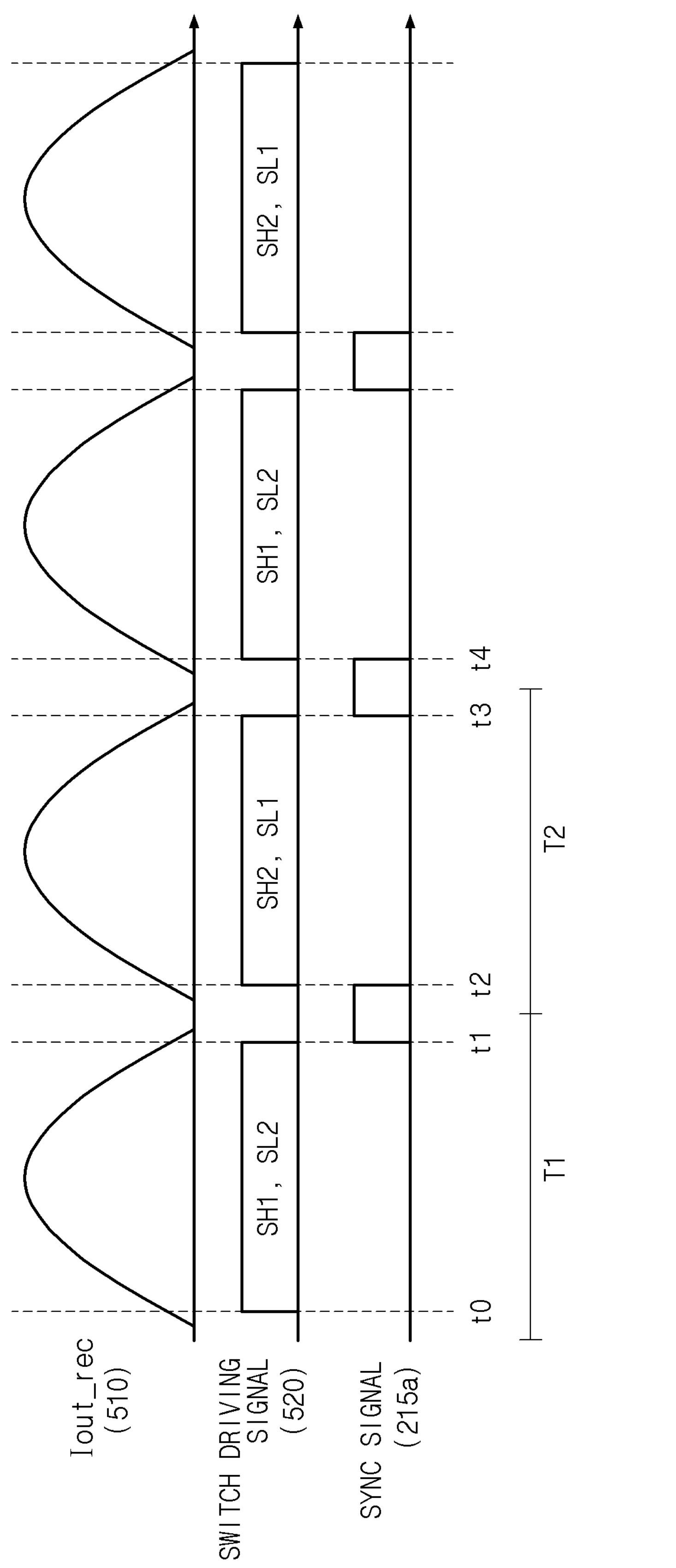
FIG. 5 is a signal flow diagram of a rectifier circuit according to certain embodiments.

FIG. 5 is a signal flow diagram of a rectifier circuit according to certain embodiments. FIG. 5 is illustrative, but not limited thereto. When Iout_rec exceeds $V_{TH}$, either switches SH1, and SL2 are shorted, or SH2, and SL1 are shorted. When Iout_rec is less than $V_{TH}$, the synch signal generates a pulse (between times t1 and t2, and between times t3 and t4).

Referring to FIGS. 4 and 5, a rectifier circuit 215 may generate an output current Iout_rec 510 which is rectified into a half wave form. A switch driving signal 520 may be generated by a first comparator 411 and a second comparator 412.

For example, in a first period T1, a first switch SH1 and a fourth switch SL2 may be turned on by the switch driving signal 520, and a second switch SH2 and a third switch SL1 may be turned off. In the first period T1, the switch driving signal 520 may be an output signal of the first comparator 411.

In a second period T2, the second switch SH2 and the third switch SL1 may be turned on by the switch driving signal 520, and the first switch SH1 and the fourth switch SL2 may be turned off. In the second period T2, the switch driving signal 520 may be an output signal of the second comparator 412.

According to certain embodiments, a sync signal 215*a* may have a phase opposite to the switch driving signal 520. The sync signal 215*a* may be an output signal of a combiner 420.

For example, in a conduction interval (an interval from t0 to t1 or an interval from t2 to t3) where the output current Iout_rec 510 is greater than or equal to (is greater than) a specified value (e.g., a current value corresponding to a reference voltage $V_{TH}$ of FIG. 4), the switch driving signal 520 may be 1. In this case, the sync signal 215*a* may have a first state (a value of 0).

For another example, in an inactive interval (an interval from t1 to t2 or an interval from t3 to t4) where the output current Iout_rec 510 is less than (or is less than or equal to) the specified value (e.g., the current value corresponding to the reference voltage $V_{TH}$ of FIG. 4) and is 0, the switch driving signal 520 may be 0. In this case, the sync signal 215*a* may have a second state (a value of 1).

According to certain embodiments, in the inactive interval (the interval from t1 to t2 or the interval from t3 to t4) where the switch driving signal 520 is 0, the output current Iout_rec 510 may be 0. For example, when a threshold of a body diode of a switch included in the switch driving signal 520 is higher than the reference voltage $V_{TH}$ of FIG. 4, in the inactive interval (the interval from t1 to t2 or the interval from t3 to t4) where the switch driving signal 520 is 0, the output current Iout_rec 510 may be 0.

Charging Circuit

Figure 6:
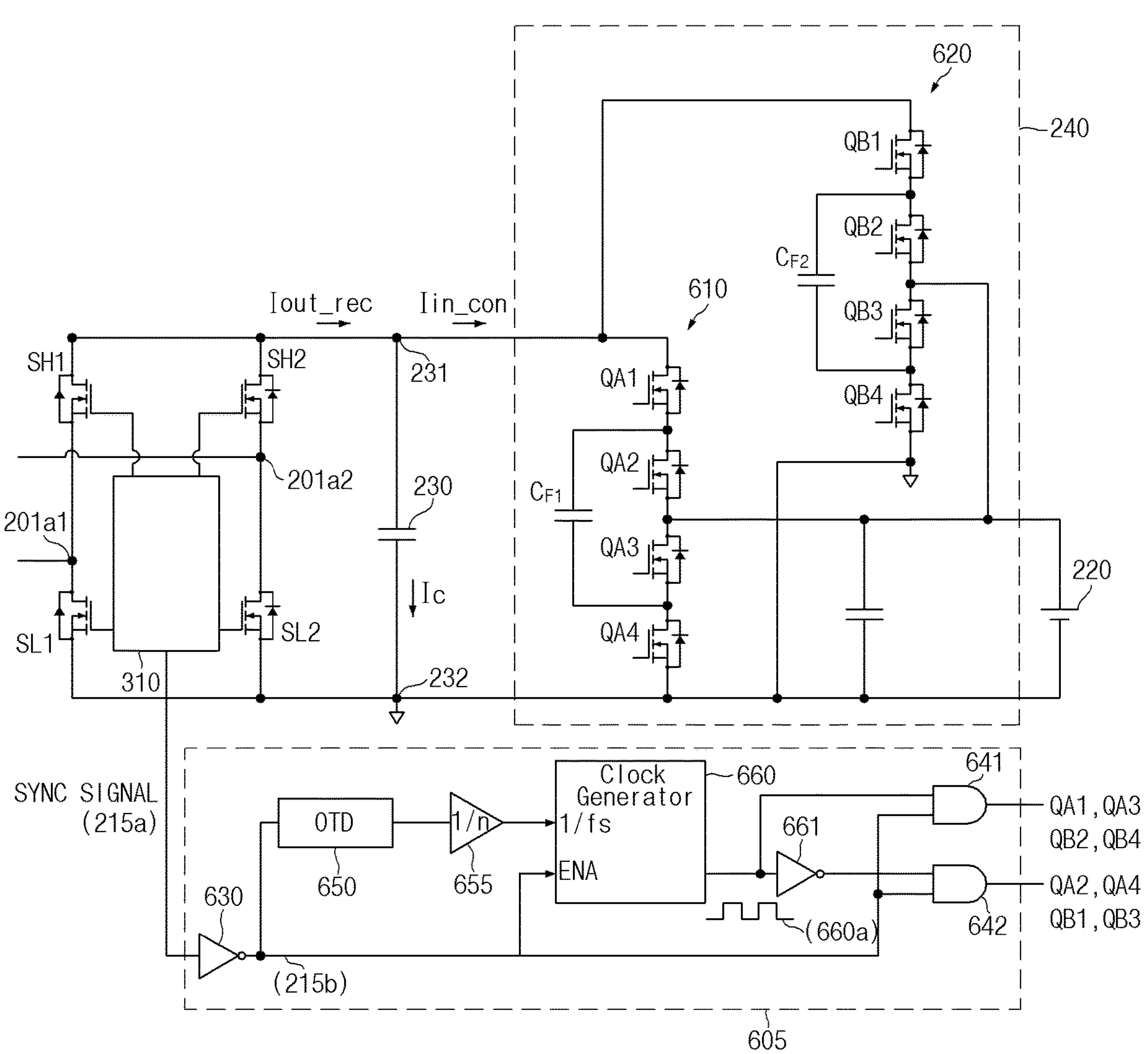
FIG. 6 illustrates a configuration of a charging circuit according to certain embodiments.

FIG. 6 illustrates a configuration of a charging circuit according to certain embodiments.

Referring to FIG. 6, a reception controller 310 may provide a sync signal 215*a* to a charging control circuit 605 of a charging circuit 240.

The charging circuit 240 may include the charging control circuit 605, a first SCVD 610, and a second SCVD 620. The charging control circuit 605 may control operations of switches included in the first SCVD 610 and the second SCVD 620 based on the sync signal 215*a*.

The first SCVD 610 may include a first flying capacitor CF1 and first group switches (first to fourth charging switches QA1 to QA4). The second SCVD 620 may include a second flying capacitor CF2 and second group switches (first to fourth charging switches QB1 to QB4).

According to certain embodiments, the first SCVD 610 and the second SCVD 620 may alternately operate. For example, according to a first clock signal, the first SCVD 610 may operate in a charge mode for charging the first flying capacitor CF1 and the second SCVD 620 may operation in a discharge mode for discharging the second flying capacitor CF2. According to a second clock signal, the first SCVD 610 may operate in a discharge mode for discharging the first flying capacitor CF1 and the second SCVD 620 may operation in a charge mode for charging the second flying capacitor CF2.

The charging control circuit 605 may deactivate switches included in the charging circuit 240 in response to the received sync signal 215*a*. For example, the charging control circuit 605 may allow the first SCVD 610 and the second SCVD 620 to operate, when the sync signal 215*a* is 0, and may allow operations of the first SCVD 610 and the second SCVD 620 to be stopped, when the sync signal 215*a* is 1. The sync signal 215*a* may be inverted using an inverter 630 to be provided as an input of each of a first adder 641 (e.g., an AND gate) and a second adder 642 (e.g., an AND gate).

As a result, an output current Iout_rec of a rectifier circuit 215 and an input current Iin_con of the charging circuit 240 may have a waveform similar to substantially the same phase, and a ripple of a current Ic of a rectifying capacitor 230 may be reduced.

According to certain embodiments, the sync signal 215*a* may have substantially the same frequency as the output current Iout_rec of the rectifier circuit 215. Furthermore, the frequency of the output current Iout_rec of the rectifier circuit 215 may be substantially the same as a power transmission frequency of the wireless charger 202. For example, when the power transmission frequency of the wireless charger 202 is changed, the reception controller 310 may detect a zero crossing point of the output current Iout_rec of the rectifier circuit 215 and may generate and transmit the sync signal 215*a* to the charging circuit 240.

The charging control circuit 605 may change switching frequencies of the first SCVD 610 and the second SCVD 620 in response to the received sync signal 215*a*. For example, the charging control circuit 605 may set the switching frequencies of the first SCVD 610 and the second SCVD 620 to an integer multiple of the frequency of the sync signal 215*a* (or the power transmission frequency). The period of the first clock signal 710 can be ½(t1−t0), and the period of the second clock signal 720 can be ⅓(t1−t0).

The charging control circuit 605 may include a first inverter 630, a time measurement unit 650, a time division unit 655, a clock generator 660, a second inverter 662, a first adder 641, or a second adder 642.

The first inverter 630 may invert the sync signal 215*a*. The time measurement unit 650 may measure a conduction time when the inverted sync signal 215*b* is kept at 1 (a conduction time of the rectifier circuit 215). The time division unit 655 may divide the conduction time into N (an integer number of) time intervals. The clock generator 660 may generate one clock signal 660*a* for each of the N (integer number of) time intervals. The inverted sync signal 215*b* may be input as an enable signal to the clock generator 660.

The first adder 641 may combine the clock signal 660*a* and the inverted sync signal 215*b* to generate a first control signal. The first control signal may be a signal for controlling the first switch QA1 and the third switch QA3 of the first SCVD 610 and the second switch QB2 and the fourth switch QB4 of the second SCVD 620.

The second adder 642 may combine a signal in which the clock signal 660*a* is inverted through the second inverter 662 and the inverted sync signal 215*b* to generate a second control signal. The second control signal may be a signal for controlling the second switch QA2 and the fourth switch QA4 of the first SCVD 610 and the first switch QB1 and the third switch QB3 of the second SCVD 620.

Figure 7:
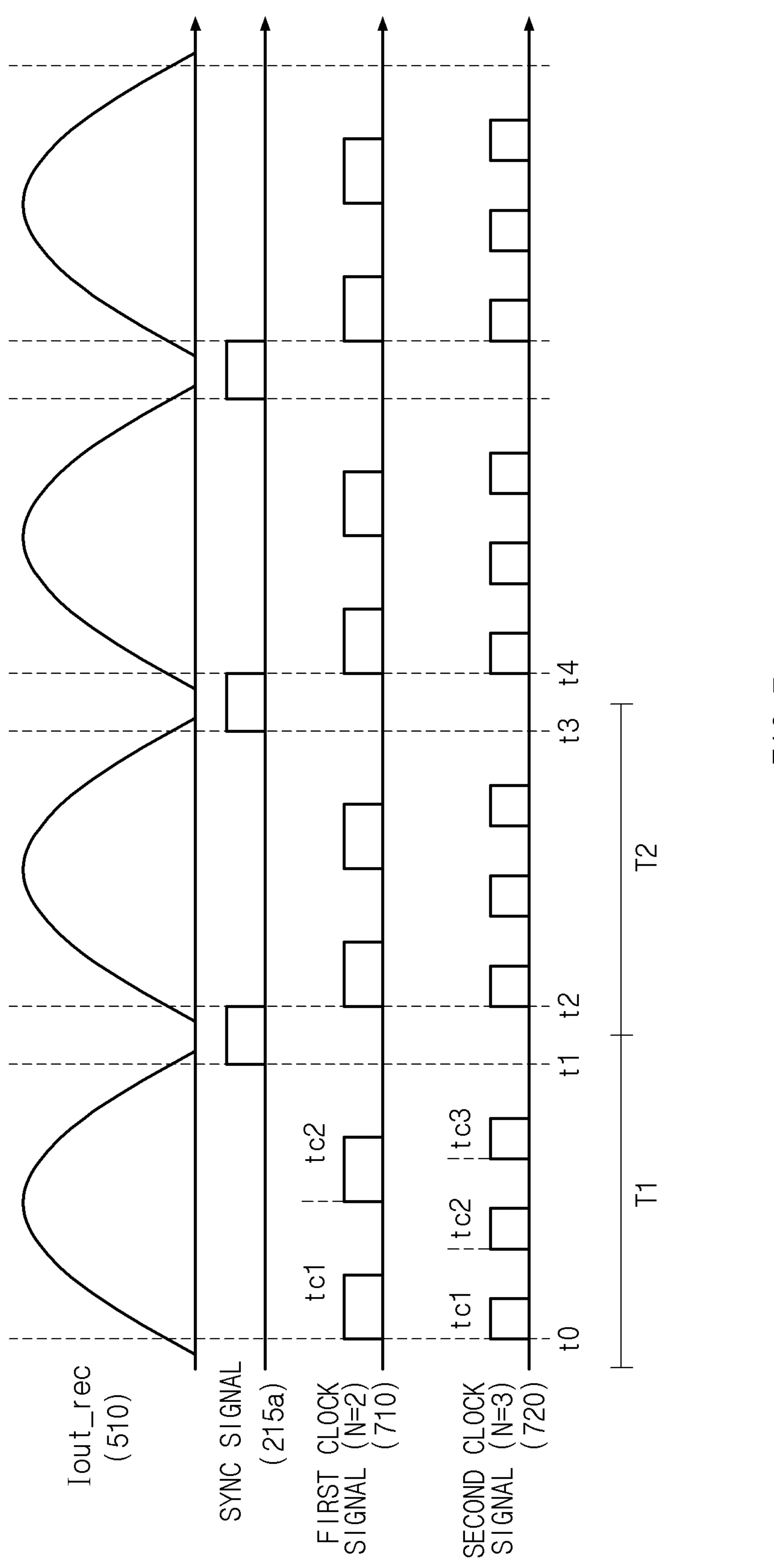
FIG. 7 illustrates generation of a clock signal of a charging circuit according to certain embodiments.

FIG. 7 illustrates generation of a clock signal of a charging circuit according to certain embodiments.

Referring to FIGS. 6 and 7, in a conduction interval (an interval from t0 to t1 or an interval from t2 to t3) where an output current Iout_rec 510 is greater than or equal to (or is greater than) a specified value (e.g., a current value corresponding to a reference voltage $V_{TH}$ of FIG. 4), a sync signal 215*a* may have a first state (e.g., a value of 0). In an inactive interval (an interval from t1 to t2 or an interval from t3 to t4) where the output current Iout_rec 510 is less than (or is less than or equal to) the specified value (the current value corresponding to the reference voltage $V_{TH}$ of FIG. 4), the sync signal 215*a* may have a second state (e.g., a value of 1).

The sync signal 215*a* may have substantially the same frequency as the output current Iout_rec 510 of the rectifier circuit 215. Furthermore, the frequency of the output current Iout_rec 510 of the rectifier circuit 215 may be substantially the same as a power transmission frequency of an external wireless power supply device 202.

A charging control circuit 605 may divide the conduction interval (the interval from t0 to t1 or the interval from t2 to t3) where the sync signal 215*a* has the first state (e.g., the value of 0) into an integer number (N) of intervals. For example, when N=2, a conduction interval of a first clock time 710 may be divided into a first interval tc1 and a second interval tc2. For another example, when N=3, a conduction interval of a second clock time 720 may be divided into a first interval tc1, a second interval tc2, and a third interval tc3.

The integer N may be determined with regard to a power transmission frequency of the wireless power supply device 202 or a circuit characteristic (or stability) of the power management module 210.

The charging control circuit 605 may generate a clock signal (e.g., a first clock signal 710 or a second clock signal 720) of a duty of 50% for each divided time interval and may control switches included in the first SCVD 610 and the second SCVD 620 using the generated clock signal.

For example, when the frequency of the output current Iout_rec 510 (or the power transmission frequency of the wireless power supply device 202) is $f_0$ and when N=2, the first clock signal 710 may be generated and the switching frequency of the charging circuit 240 may be set to $2f_0$.

For another example, when the frequency of the output current Iout_rec 510 (or the power transmission frequency of the wireless power transmission device 202) is $f_0$ and when N=3, the second clock signal 720 may be generated and the switching frequency of the charging circuit 240 may be set to $3f_0$.

Figure 8:
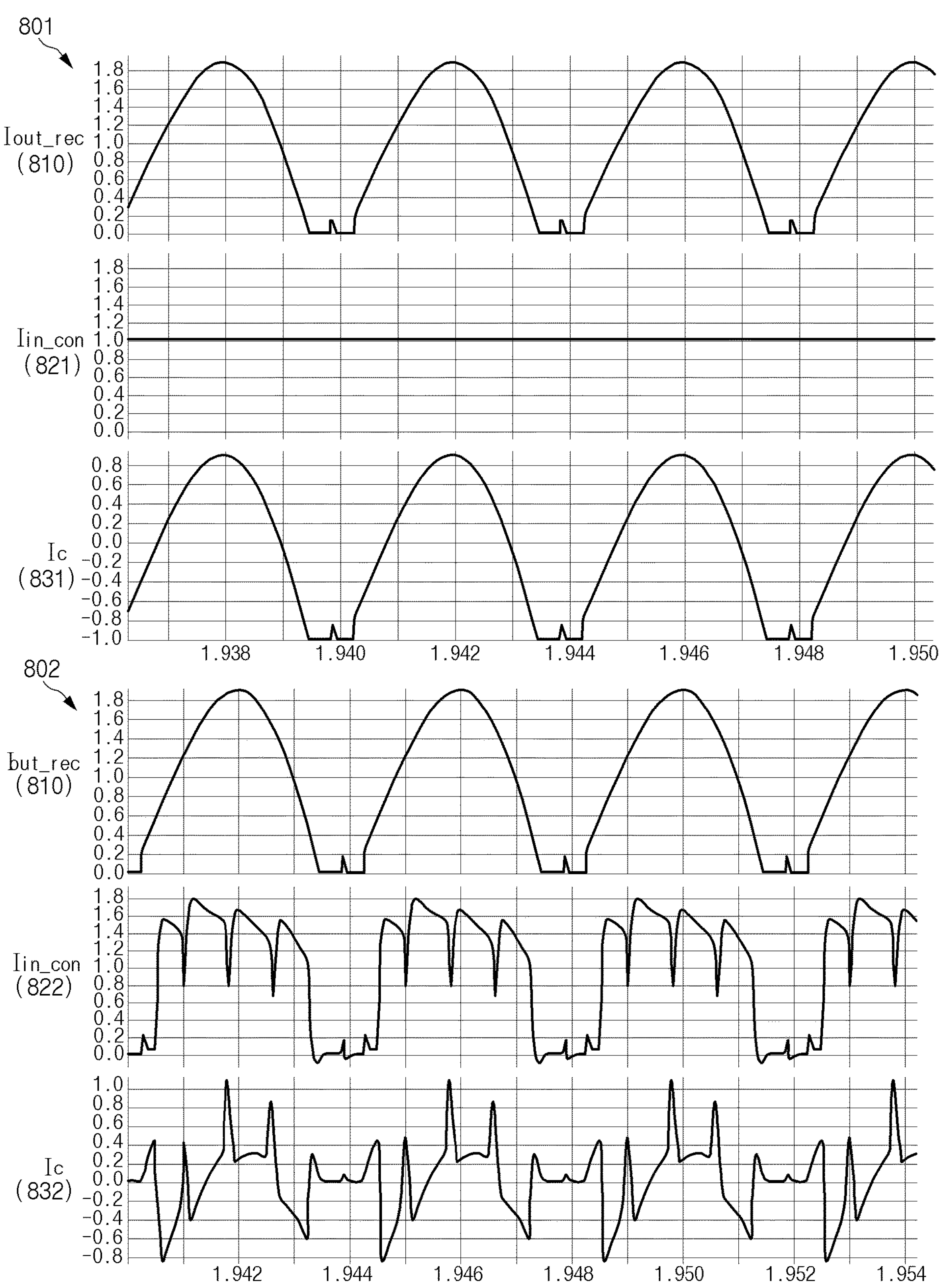
FIG. 8 is a graph of a signal for controlling a charging circuit according to certain embodiments.

FIG. 8 is a graph of a signal for controlling a charging circuit according to certain embodiments.

Referring to FIG. 8, a first graph 801 is a signal flow diagram when a sync signal is not used. An output current Iout_rec 810 of a rectifier circuit 215 may be a sine wave rectified into a half wave. When an input current Iin_con 821 of a charging circuit 240 is DC, a current Ic 831 of a rectifying capacitor 230 may have substantially the same peak-to-peak as the output current lout_rec 810 of the rectifier circuit 215. A ripple of the current Ic 831 of the rectifying capacitor 230 may have a relatively large value (e.g., RMS of 684 mA).

A second graphic 802 is a signal flow diagram when a sync signal 215*a* is used. The output current Iout_rec 810 of the rectifier circuit 215 may be a sine wave rectified into a half wave.

The input current Iin_con 821 of the charging circuit 240 may have substantially the same phase as the output current Iout_rec 810, rather than a DC value. When the output current Iout_rec 810 is 0, the input current Iin_con 822 of the charging circuit 240 may also be 0.

For example, when N=2, the switching frequency of the charging circuit 240 may be two times the frequency of the input current Iin_con 822. When the charging circuit 240 includes a first SCVD and a second SCVD, a switching current may occur four times within a conduction time of the rectifier circuit 215 by an alternating operation.

The current Ic 832 of the rectifying capacitor 230 may have a form different from the output current Iout_rec of the rectifier circuit 215. A ripple of the current Ic 832 of the rectifying capacitor 230 may have a relatively small value (e.g., RMS of 430 mA). The ripple of the current Ic 832 of the rectifying capacitor 230 may be more reduced than that in the first graph 801 by about 50%.

An electronic device (e.g., an electronic device 101 of FIG. 1 or an electronic device 201 of FIG. 2) according to certain embodiments may include a battery (e.g., a battery 189 of FIG. 1 or a battery 220 of FIG. 2), a receive coil that wirelessly receives power from a transmit coil of an external power device, a power management module (e.g., the power management module 188 of FIG. 1 or the power management module 210 of FIG. 2) electrically connected with the battery and the receive coil. The power management module may include a rectifier circuit (e.g., a rectifier circuit 215 of FIG. 2) that rectifies current flowing in the receive coil and includes an output terminal, a charging circuit (e.g., a charging circuit 240 of FIG. 2) that charges the battery (e.g., the battery 189 of FIG. 1 or the battery 220 of FIG. 2) that includes a plurality of switches (SH1, SL1, SH2, SL2) and an input terminal connected to the output terminal of the rectifier circuit, and a rectifying capacitor (e.g., a rectifying capacitor 230 of FIG. 2) electrically connected with the output terminal of the rectifier circuit (e.g., the rectifier circuit 215 of FIG. 2) and the input terminal of the charging circuit (e.g., the charging circuit 240 of FIG. 2). The power management module (e.g., the power management module 188 of FIG. 1 or the power management module 210 of FIG. 2) may generate a sync signal based on current flowing in the output terminal of the rectifier circuit (e.g., the rectifier circuit 215 of FIG. 2) and may control whether the plurality of switches operate or switching frequencies of the plurality of switches, based on the sync signal.

An electronic device (e.g., an electronic device 101 of FIG. 1 or an electronic device 201 of FIG. 2) according to certain embodiments may include a battery (e.g., a battery 189 of FIG. 1 or a battery 220 of FIG. 2), a power management module (e.g., a power management module 188 of FIG. 1 or a power management module 210 of FIG. 2) electrically connected with the battery (e.g., the battery 189 of FIG. 1 or the battery 220 of FIG. 2) to manage charging or discharging of the battery (e.g., the battery 189 of FIG. 1 or the battery 220 of FIG. 2), a receive coil that wirelessly receives power from a transmit coil of an external power device and is electrically connected with the power management module (e.g., the power management module 188 of FIG. 1 or the power management module 210 of FIG. 2), and a processor (e.g., a processor 110 of FIG. 1) electrically connected with the power management module (e.g., the power management module 188 of FIG. 1 or the power management module 210 of FIG. 2). The power management module (e.g., the power management module 188 of FIG. 1 or the power management module 210 of FIG. 2) may include a rectifier circuit (e.g., a rectifier circuit 215 of FIG. 2) that rectifies current flowing in the receive coil, a charging circuit (e.g., a charging circuit 240 of FIG. 2) that charges the battery (e.g., the battery 189 of FIG. 1 or the battery 220 of FIG. 2), and a rectifying capacitor (e.g., a rectifying capacitor 230 of FIG. 2). An output terminal of the rectifier circuit (e.g., the rectifier circuit 215 of FIG. 2) may be connected with an input terminal of the charging circuit (e.g., the charging circuit 240 of FIG. 2). The rectifying capacitor (e.g., the rectifying capacitor 230 of FIG. 2) may be electrically connected with the output terminal of the rectifier circuit (e.g., the rectifier circuit 215 of FIG. 2) and the input terminal of the charging circuit (e.g., the charging circuit 240 of FIG. 2). The power management module (e.g., the power management module 188 of FIG. 1 or the power management module 210 of FIG. 2) may generate a sync signal based on current flowing in the output terminal of the rectifier circuit (e.g., the rectifier circuit 215 of FIG. 2) and may control whether a plurality of switches included in the charging circuit (e.g., the charging circuit 240 of FIG. 2) operate or switching frequencies of the plurality of switches, based on the sync signal.

According to certain embodiments, the power management module (e.g., the power management module 188 of FIG. 1 or the power management module 210 of FIG. 2) may turn off operations of the plurality of switches, when a first current of the output terminal of the rectifier circuit (e.g., the rectifier circuit 215 of FIG. 2) is less than or equal to a specified value.

According to certain embodiments, the sync signal may be in a first state when the first current is greater than the specified value and may be in a second state when the first current is less than or equal to the specified value.

According to certain embodiments, the power management module (e.g., the power management module 188 of FIG. 1 or the power management module 210 of FIG. 2) may turn off the plurality of switches included in the charging circuit (e.g., the charging circuit 240 of FIG. 2), when the sync signal is in the second state.

According to certain embodiments, a first current of the output terminal of the rectifier circuit (e.g., the rectifier circuit 215 of FIG. 2) may have substantially the same as a second current of the input terminal of the charging circuit (e.g., the charging circuit 240 of FIG. 2).

According to certain embodiments, the power management module (e.g., the power management module 188 of FIG. 1 or the power management module 210 of FIG. 2) may determine the switching frequencies based on a time when the sync signal is kept in a first state.

According to certain embodiments, the power management module (e.g., the power management module 188 of FIG. 1 or the power management module 210 of FIG. 2) may determine the switching frequencies as an integer multiple of a frequency of a first current of the output terminal of the rectifier circuit (e.g., the rectifier circuit 215 of FIG. 2).

According to certain embodiments, the power management module (e.g., the power management module 188 of FIG. 1 or the power management module 210 of FIG. 2) may generate clock signals corresponding to the switching frequencies based on the sync signal.

According to certain embodiments, the power management module (e.g., the power management module 188 of FIG. 1 or the power management module 210 of FIG. 2) may generate the sync signal based on a voltage of a first terminal of the receive coil and a voltage of a second terminal of the receive coil.

According to certain embodiments, the charging circuit (e.g., the charging circuit 240 of FIG. 2) may include a first switched capacitor voltage divider (SCVD) circuit and a second SCVD circuit. The first SCVD circuit and the second SCVD circuit may alternately charge the battery (e.g., the battery 189 of FIG. 1 or the battery 220 of FIG. 2).

According to certain embodiments, the first SCVD circuit may include a first flying capacitor and switches of a first group, and the second SCVD circuit may include a second flying capacitor and switches of a second group.

According to certain embodiments, the charging circuit (e.g., the charging circuit 240 of FIG. 2) may generate a plurality of clock signals in a period of a first current of the output terminal of the rectifier circuit (e.g., the rectifier circuit 215).

According to certain embodiments, the first flying capacitor may be charged by a first clock signal among the plurality of clock signals, and the second flying capacitor may be discharged by the first clock signal.

According to certain embodiments, the first flying capacitor may be discharged by a second clock signal among the plurality of clock signals, and the second flying capacitor may be charged by the second clock signal.

According to certain embodiments, the plurality of clock signals may have a duty cycle of 50%.

According to certain embodiments, the power management module (e.g., the power management module 188 of FIG. 1 or the power management module 210 of FIG. 2) may transmit a power adjustment message to the external power device based on a voltage of the output terminal of the rectifier circuit (e.g., the rectifier circuit 215 of FIG. 2).

According to certain embodiments, the switching frequency may be an integer multiple of a power transmission frequency of the external power device.

According to certain embodiments, the rectifier circuit (e.g., the rectifier circuit 215 of FIG. 2) may be a full-bridge circuit.

According to certain embodiments, the sync signal may have a phase opposite to a switching driving signal for controlling a switch included in the rectifier circuit (e.g., the rectifier circuit 215 of FIG. 2).

According to certain embodiments, the switching driving signal may include a first switching driving signal for comparing a first terminal of the receive coil with a reference voltage and a second switching driving signal for comparing a second terminal of the receive coil with the reference voltage. The sync signal may be generated by inverting a signal in which the first switching driving signal and the second switching driving signal are combined.

According to certain embodiments, a method for charging a battery 220 in an electronic device 201, comprises: wirelessly receiving power from a transmit coil 202*a* of wireless charger 202 at a receive coil 201*a* in the electronic device 201; rectify current flowing in the receive coil 201*a* with a rectifier circuit 215 including an output terminal; charging the battery 220 with a charging circuit 240 including a plurality of switches (SH1, SL1, SH2, SL2) and an input terminal, wherein the input terminal is connected to the output terminal of the rectifier circuit and wherein a rectifying capacitor 230 is electrically connected with the output terminal of the rectifier circuit and the input terminal of the charging circuit, and generating a sync signal based on current flowing in the output terminal of the rectifier circuit and controlling whether the plurality of switches operate or switching frequencies of the plurality of switches, based on the sync signal.

According to certain embodiments, the method may further comprise turning off the plurality of switches when a current of the output terminal of the rectifier circuit is less than or equal to a specified value.

According to certain embodiments, the sync signal is in a first state when the current of the output terminal is greater than the specified value and is in a second state when the current of the output terminal is less than or equal to the specified value.

According to certain embodiments, the method may further comprise turning off the plurality of switches, when the sync signal is in the second state.

According to certain embodiments, a current of the output terminal of the rectifier circuit has substantially the same as a current of the input terminal of the charging circuit.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising: a battery; a receive coil configured to wirelessly receive power from a transmit coil of a wireless charger; and a power management module electrically connected with the battery and the receive coil, wherein the power management module includes:

a rectifier circuit configured to rectify current flowing in the receive coil, the rectifier circuit including an output terminal, wherein the output terminal outputs a rectified current;

a charging circuit configured to charge the battery including a plurality of switches and an input terminal, the input terminal connected to the output terminal of the rectifier circuit; and a rectifying capacitor connected to a node where both the output terminal of the rectifier circuit providing the rectified current, and the input terminal of the charging circuit are connected, and wherein the power management module generates a sync signal based on current flowing in the output terminal of the rectifier circuit and controls whether the plurality of switches operate or switching frequencies of the plurality of switches, based on the sync signal, wherein the charging circuit includes a first switched capacitor voltage divider (SCVD) circuit and a second SCVD circuit, and wherein the first SCVD circuit and the second SCVD circuit alternatingly charge the battery.

2. The electronic device of claim 1, wherein the power management module turns off the plurality of switches when a current of the output terminal of the rectifier circuit is less than or equal to a specified value.

3. The electronic device of claim 2, wherein the sync signal is in a first state when the current of the output terminal is greater than the specified value and is in a second state when the current of the output terminal is less than or equal to the specified value.

4. The electronic device of claim 3, wherein the power management module turns off the plurality of switches, when the sync signal is in the second state.

5. The electronic device of claim 1, wherein a current of the output terminal of the rectifier circuit has substantially the same as a current of the input terminal of the charging circuit.

6. The electronic device of claim 1, wherein the power management module determines the switching frequencies based on a time when the sync signal is kept in a first state.

7. The electronic device of claim 6, wherein the power management module determines the switching frequencies as an integer multiple of a frequency of a current of the output terminal of the rectifier circuit.

8. The electronic device of claim 6, wherein the power management module generates clock signals corresponding to the switching frequencies based on the sync signal.

9. The electronic device of claim 1, wherein the power management module generates the sync signal based on a voltage of a first terminal of the receive coil and a voltage of a second terminal of the receive coil.

10. The electronic device of claim 1, wherein the first SCVD circuit includes a first flying capacitor and switches of a first group, and wherein the second SCVD circuit includes a second flying capacitor and switches of a second group.

11. The electronic device of claim 10 wherein the charging circuit generates a plurality of clock signals during a period of a current of the output terminal of the rectifier circuit.

12. The electronic device of claim 11, wherein the first flying capacitor is charged by a first clock signal among the plurality of clock signals, and wherein the second flying capacitor is discharged by the first clock signal.

13. The electronic device of claim 12, wherein the first flying capacitor is discharged by a second clock signal among the plurality of clock signals, and wherein the second flying capacitor is charged by the second clock signal.

14. The electronic device of claim 1, wherein the switching frequencies are an integer multiple of a power transmission frequency of an external power device.

15. The electronic device of claim 1, wherein the rectifying capacitor receives a ripple current, and wherein the charging circuit receives an input current substantially equal to the difference between the rectified current and the input current, and wherein the sync signal reduces the ripple current.

16. A method for charging a battery in an electronic device, the method comprising: wirelessly receiving power from a transmit coil of a wireless charger at a receive coil in the electronic device; rectify current flowing in the receive coil with a rectifier circuit including an output terminal, the output terminal providing a rectified current;

charging the battery with a charging circuit including a plurality of switches and an input terminal, wherein the input terminal is connected to the output terminal of the rectifier circuit providing the rectified current, and wherein a rectifying capacitor is electrically connected to a node where the output terminal of the rectifier circuit providing the rectified current and the input terminal of the charging circuit are connected, and generating a sync signal based on current flowing in the output terminal of the rectifier circuit and controlling whether the plurality of switches operate or switching frequencies of the plurality of switches, based on the sync signal, wherein the charging circuit includes a first switched capacitor voltage divider (SCVD) circuit and a second SCVD circuit, and wherein the first SCVD circuit and the second SCVD circuit alternatingly charge the battery.

17. The method of claim 16, further comprising turning off the plurality of switches when a current of the output terminal of the rectifier circuit is less than or equal to a specified value.

18. The method of claim 17, wherein the sync signal is in a first state when the current of the output terminal is greater than the specified value and is in a second state when the current of the output terminal is less than or equal to the specified value.

19. The method of claim 18, further comprising turning off the plurality of switches, when the sync signal is in the second state.

20. The method of claim 16, wherein a current of the output terminal of the rectifier circuit has substantially the same as a current of the input terminal of the charging circuit.

* * * * *